United States Patent
Spagnuolo et al.

(10) Patent No.: US 6,422,524 B1
(45) Date of Patent: Jul. 23, 2002

(54) RETRACTABLE NONLINEAR GARMENT HOOK

(75) Inventors: Daniel R. Spagnuolo, Holland; Ronald C. Perry, Jenison, both of MI (US)

(73) Assignee: Johnson Controls Technology Company, Plymouth, MI (US)

(*) Notice: Subject to any disclaimer, the term of this patent is extended or adjusted under 35 U.S.C. 154(b) by 0 days.

(21) Appl. No.: 09/928,555

(22) Filed: Aug. 13, 2001

(51) Int. Cl.[7] .............................................. F16B 45/00
(52) U.S. Cl. ...................................................... 248/307
(58) Field of Search ............................... 224/313, 311; 248/307, 308, 304, 305, 339, 215, 340

(56) References Cited

U.S. PATENT DOCUMENTS

| | | |
|---|---|---|
| 3,201,077 A | 8/1965 | Heimann |
| 3,385,547 A | 5/1968 | West |
| 3,424,418 A | 1/1969 | Freedman et al. .......... 248/304 |
| 4,221,354 A | 9/1980 | Kempkers |
| 4,444,344 A | 4/1984 | Marcus et al. .............. 224/313 |
| 4,645,106 A | 2/1987 | Pawl .......................... 224/313 |
| 4,720,028 A | 1/1988 | Takemura et al. .......... 224/313 |
| 5,104,083 A | 4/1992 | Shannon ..................... 248/339 |
| 5,226,569 A | 7/1993 | Watjer et al. ............... 224/313 |
| 5,366,127 A | 11/1994 | Heinz ......................... 224/313 |
| 5,411,233 A | 5/1995 | Grimes, III et al. ........ 248/305 |
| 5,419,067 A * | 5/1995 | Drummond et al. ........ 224/313 |
| 5,492,260 A | 2/1996 | Rieden et al. .......... 224/313 X |
| 5,507,423 A | 4/1996 | Fischer et al. .............. 224/313 |
| 5,636,891 A | 6/1997 | Van Order et al. ..... 224/313 X |
| 5,829,725 A * | 11/1998 | Russo ......................... 248/304 |
| 6,065,657 A | 5/2000 | Fischer ....................... 224/313 |
| 6,095,469 A | 8/2000 | Von Alman ................. 248/304 |
| 6,315,357 B1 * | 11/2001 | Johnston ................. 224/313 X |

FOREIGN PATENT DOCUMENTS

| DE | 117961 | 1/1926 |
|---|---|---|
| FR | 768611 | 2/1934 |

* cited by examiner

*Primary Examiner*—Ramon O. Ramirez
(74) *Attorney, Agent, or Firm*—Price, Heneveld, Cooper, DeWitt & Litton

(57) ABSTRACT

A garment hook assembly includes a housing which can be injection molded and includes two halves hinged together for surrounding and receiving a retractable garment hook. The housing halves each include an arcuate slot which align with one another when the housing is folded over the garment hook to a closed position for receiving a pair of laterally extending spaced pins extending from the hook into the arcuate slots of the housing for guiding the translation motion of the garment hook along a nonlinear arcuate path as it extends from and retracts into the housing.

20 Claims, 3 Drawing Sheets

RETRACTABLE NONLINEAR GARMENT HOOK

BACKGROUND OF THE INVENTION

The present invention relates to a garment hook for a vehicle and particularly one which translates between a retracted position and an extended position in a nonlinear track.

Vehicles typically include garment hooks for the convenience of passengers. Such garment hooks frequently are integrated into grab handle bezels and permanently extend therefrom. There have been several proposals to provide flush mounted garment hangers which move between a retracted flush mounted position out of the way when not in use and an extended position, providing a significantly more functional garment hook when extended as opposed to such fixed garment hooks which tend to be relatively small. U.S. Pat. Nos. 4,221,354 and 4,444,344 disclose garment hooks which pivot between retracted and extended positions, while U.S. Pat. Nos. 5,411,233 and 5,507,423 disclose push-push straight line linear garment hooks which latch between a retracted position within a vehicle headliner or roof area and an extended position for use. With modern vehicle designs, the space in the roof area behind the headliner of a vehicle is somewhat limited and linear push-push garment hooks require a significant amount of room which is frequently not available.

Also, the many retractable garment hangers proposed may require a significant number of parts and are somewhat complicated and prone to failure during long-term use. Further, the complicated configurations of some retractable garment hooks add significantly to the expense during manufacture, assembly, and installation in a vehicle.

Thus, there remains a need for a retractable garment hook which is relatively inexpensive to manufacture, easily assembled, and provides the desired storage and extension of the hook for providing a practical size garment hook when extended and which is unobtrusively flush mounted when retracted to a stored position.

SUMMARY OF THE INVENTION

The garment hook assembly of the present invention satisfies this need by providing a housing which can be injection molded and includes two halves hinged together which can be joined for surrounding and receiving a retractable garment hook during assembly. The garment hook and housing include a push-push, spring-loaded latch for translating the garment hook in a nonlinear path upon actuation and latching the hook into a retracted stored position when returned toward the vehicle headliner.

In the preferred embodiment of the invention, a rotary damper is coupled to the housing and engages the garment hook for damping the motion of the hook as it extends from a retracted position. The housing halves each include an arcuate slot which align with one another when the housing is folded over the garment hook to a closed position for receiving a pair of laterally extending spaced pins extending from the hook into the arcuate slots of the housing for guiding the motion of the garment hook along a nonlinear arcuate path as it extends from and retracts into the housing. Such motion allows the garment hook assembly to occupy a relatively compact space, and it can be mounted, for example, to the bezel of a grab handle employed in the vehicle.

These and other features, objects and advantages of the present invention will become apparent upon reading the following description thereof together with reference to the accompanying drawings.

DETAILED DESCRIPTION OF THE PREFERRED EMBODIMENT

Figure 1:
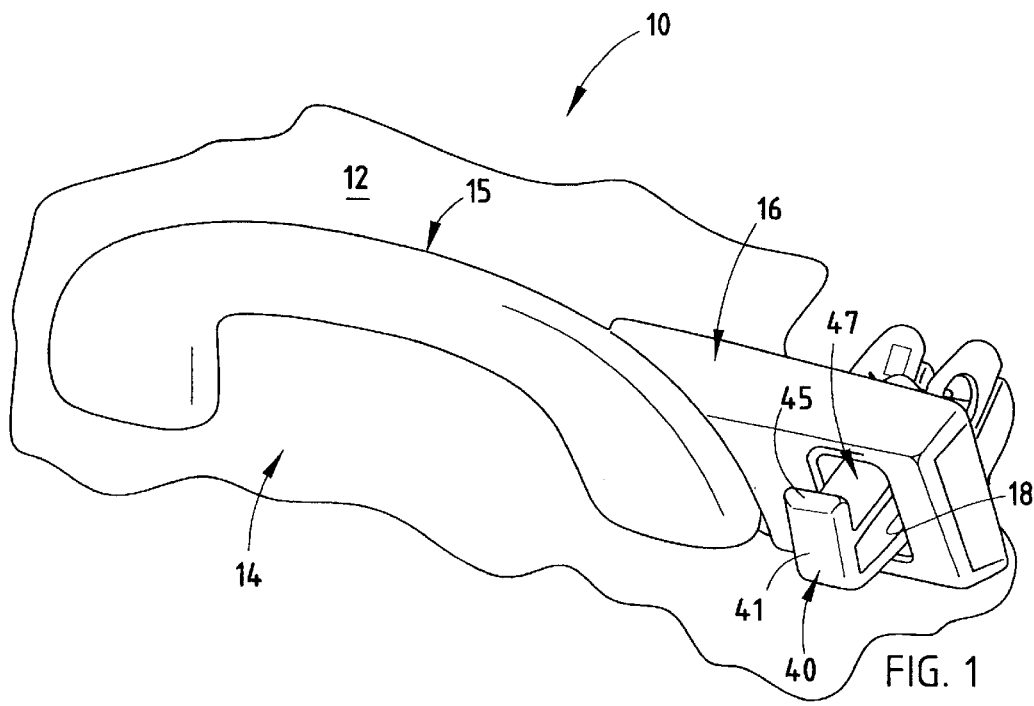
FIG. 1 is a perspective view of the garment hook of the present invention, shown installed in a vehicle grab handle assembly.
Figure 2:
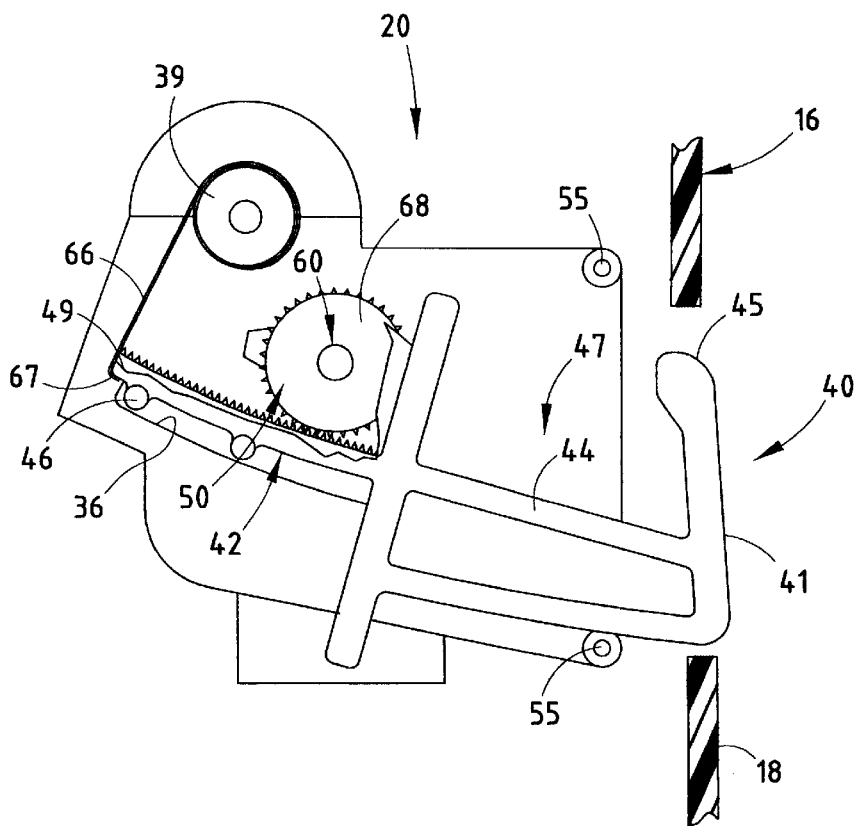
FIG. 2 is a vertical cross-sectional view, partly broken away, of the garment hook assembly of the present invention, shown in a retracted position.
Figure 3:
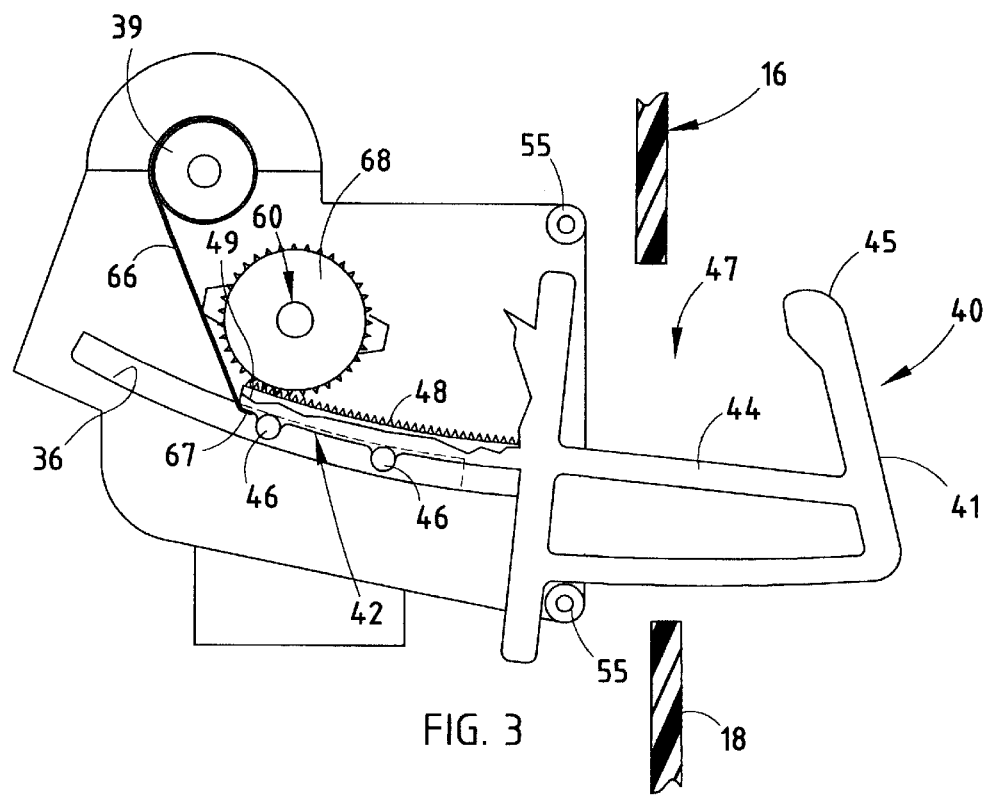
FIG. 3 is a vertical cross-sectional view, partly broken away, of the garment hook assembly shown in FIG. 2, shown in an extended use position.

Referring initially to FIGS. 1 and 2, there is shown a section of a vehicle 10, such as an automobile, which includes a headliner 12 covering the roof area 14 of the vehicle and particularly, as shown in FIGS. 2 and 3, there is shown cross-sectional views of the rear seat area of the vehicle which includes a grab handle 15 having a bezel 16 mounted above the rear seat window. The grab handle itself can be of conventional construction having a polymeric bezel 16 with a generally rectangular aperture 18 for receiving therein the retractable garment hook assembly 20 of the present invention. Assembly 20 comprises, in the preferred embodiment, a housing 30, which is mounted in stationary relationship to the bezel 16 by mounting flanges 31 and 32 (FIG. 4), and a movable garment hook 40 which is best seen in FIG. 5 and which moves within housing 30 between a stored position (shown in FIG. 2) in which the front face 41 of the garment hook 40 is substantially flush with the face of bezel 16 and an extended position (FIGS. 1 and 3) in which the hook 40 is extended for use by a vehicle operator or passenger for receiving hangers or the like.

Figure 4:
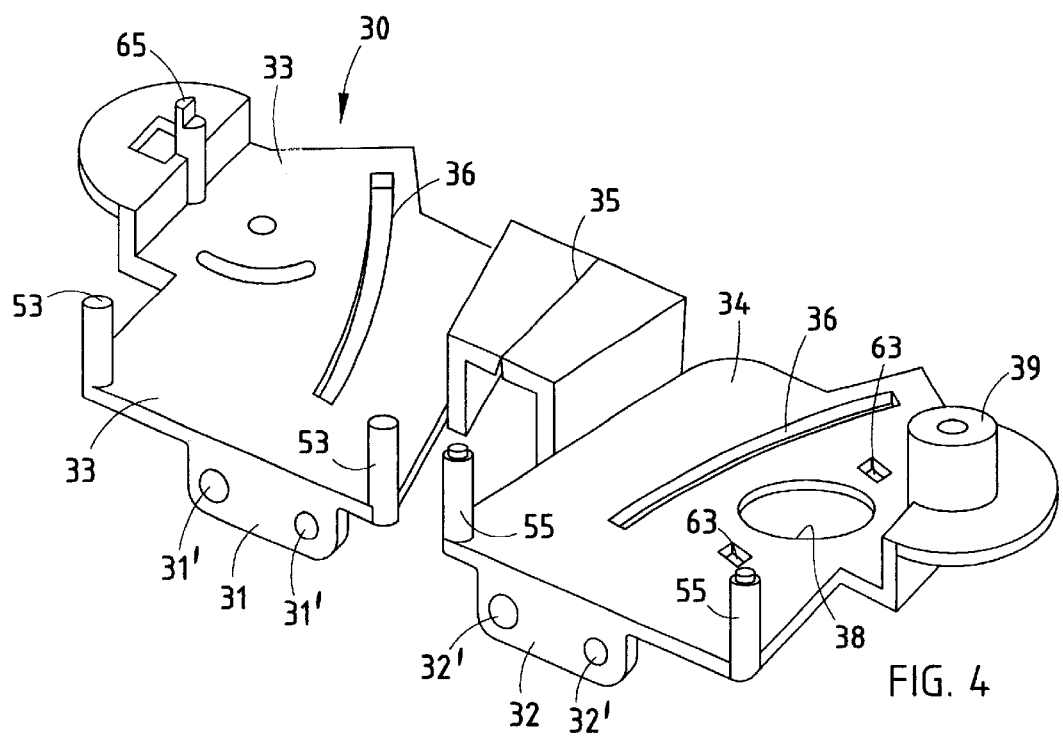
FIG. 4 is a perspective view of the housing of the garment hook assembly, shown prior to assembly.
Figure 5:
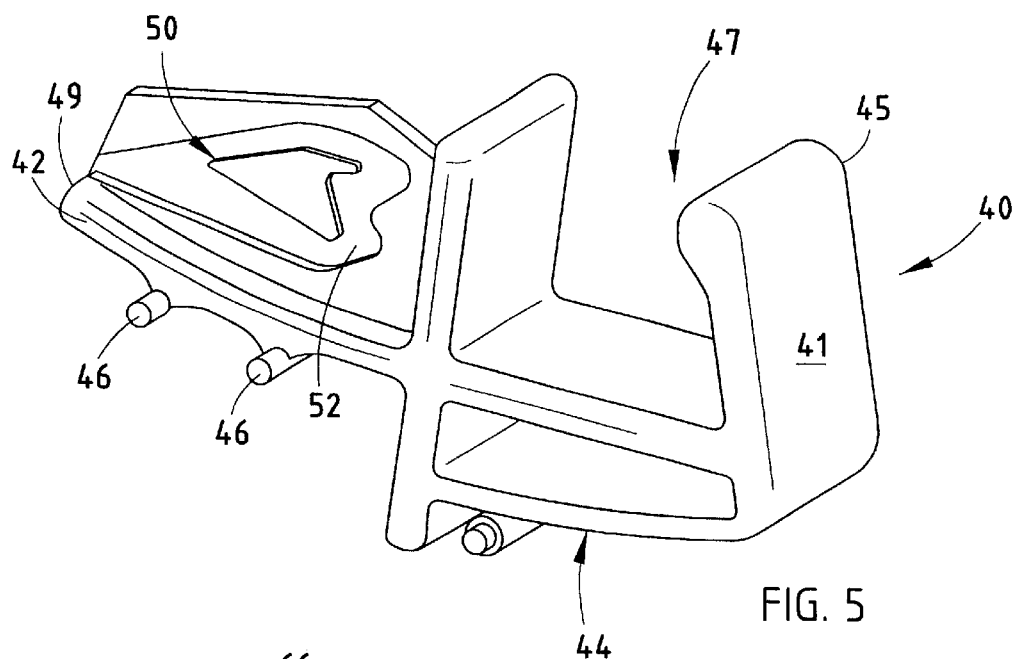
FIG. 5 is a perspective view of the garment hook.
Figure 6:
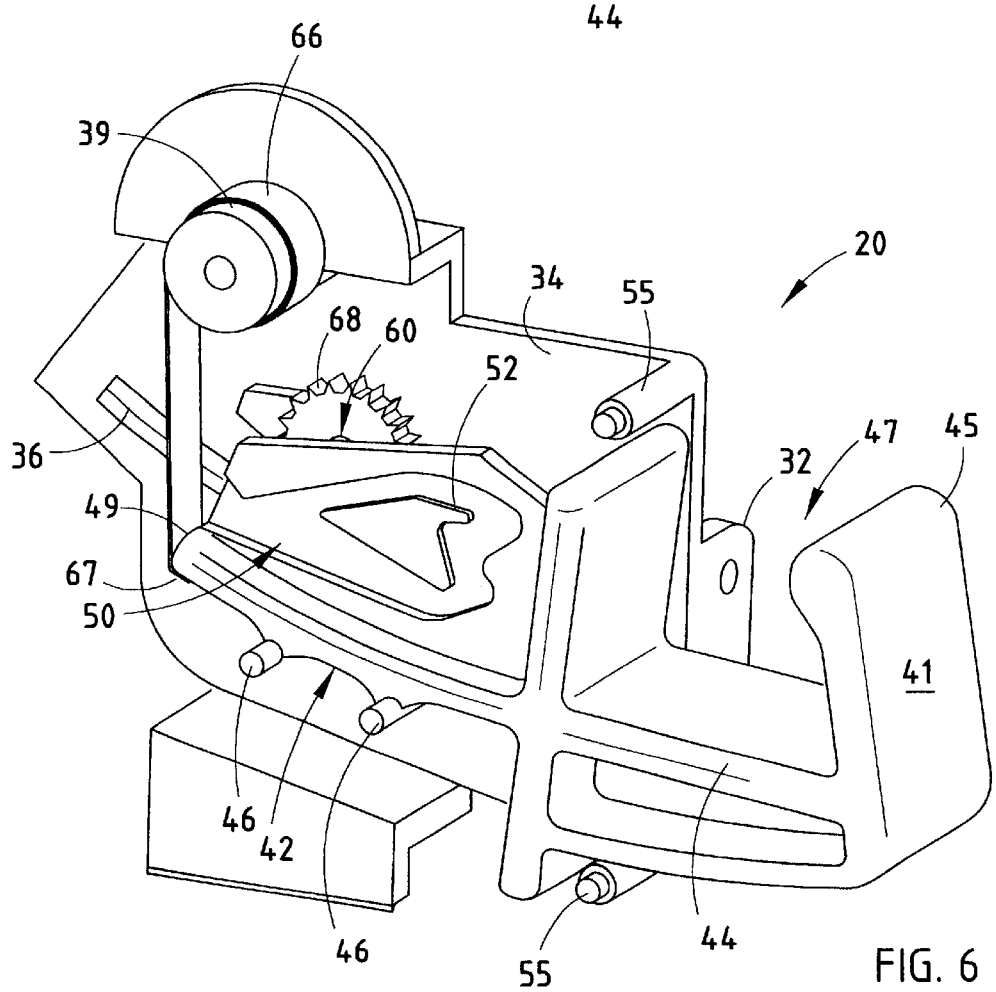
FIG. 6 is a perspective view showing the garment hook and its relationship to one side of the housing with the remaining side of the housing removed.

Housing 30, as best seen in FIG. 4, comprises a first half 33 and a second half 34 which define sections which are joined by an integral polymeric hinge 35. Halves 33, 34 each include arcuate tracks 36 which are mirror images. When the housing is closed around the hook 40, the tracks 36 in halves 33, 34 are aligned and each receives a pair of spaced, laterally projecting pins 46 extending outwardly from opposite sides of the body 42 of hook 40. The hook body includes an outwardly extending arm 44 having an upwardly turned end 45 defining a hook-receiving slot 47 for receiving garment hangers or garments themselves. One edge of the body 42 includes a plurality of gear teeth 48 (FIGS. 2 and 3) which mesh with a gear 68 (FIGS. 2, 3, and 6) of a rotary damper 60, which is mounted within a damper mounting aperture 38 in housing half 34 by conventional means, such as snap-fitting into slots 63 (FIG. 4). Halves 33, 34 are held together by bonding adhesive of tips on posts 55 and sockets on posts 53 which snap fit together and which can be adhesively bonded as well as the interconnection of a spool 39 to a post 65.

Hook 40 also includes a push-push spring-loaded latch assembly 50 comprising, in the preferred embodiment, a heart shaped track 52, which is engaged by a pawl associated with a kick-out spring 66 in a conventional manner. Such push-push latch assemblies are in widespread conventional use in the automotive industry for a variety of accessories, such as storage compartments and the like. Spring 66 surrounds a spool 39 on housing half 34 and has an end 67 (FIGS. 2, 3, and 6) which engages an end 49 of hook body 42 to urge the hook to an extended position when released by the latch. The interlocking posts 53 and 55 space the housing halves from one another a distance sufficient to allow clearance of the arm 44 of garment hook 40 to extend within the housing as shown in FIG. 2. The mechanism is actuated by depressing surface 41 in its retracted position, as shown in FIG. 2, urging the pawl from the latch position in track 52. This allows the kick-out spring 66 to urge the hook to an extended use position, as shown in FIG. 3. The rotary damper 60, with its gear teeth 68 engaging teeth 48 of the hook 40, controls the outward translation motion to provide smooth extension of the hook to a use position.

The radius of curvature of tracks 36 can be varied depending upon a particular vehicle headliner and roof structure, such that the hook will, in effect, curve in slightly behind the headliner in the relatively limited space available above side windows. The nonlinear tracks 36 in cooperation with the mating pins 46 allow the arm 40 to translate in a nonlinear path from the stored to the use position, requiring a minimum amount of space. By providing a pair of spaced pins 46 which have a diameter less than the width of tracks 36, the hook slides along the upper edge of the tracks, assuring smooth and stable operation of hook 40 in its transition between a fully extended and a fully retracted position.

The housing and garment hook can be made of a suitable polymeric material, such as polycarbonate, ABS, polyvinyl chloride or the like, and colored and textured to conform to the vehicle interior, including the grab handle bezel 16. Flanges 31, 32 include suitable fastening apertures 31' and 32' to allow fasteners, such as screws or the like, to be employed for securing the garment hook assembly 20 to the bezel. In other embodiments, the garment hook assembly can be mounted directly to either the headliner or other roof mounting structure for providing support for the garment hanger. The damper assembly 60, like the push-push latch assembly 50, is of conventional construction used widely in the automotive industry for damping the motion of grab handles, small storage doors, and the like and, like the push-push latches, are commercially available.

It will become apparent to those skilled in the art that various modifications to the preferred embodiment of the invention as described herein can be made without departing from the spirit or scope of the invention as defined by the appended claims.

The invention claimed is:

1. A garment hook assembly comprising:
   a housing including a pair of housing sections joined by an integral hinge, wherein each of said sections include a nonlinear track which are aligned with one another when said housing is closed around said hinge; and
   a garment hook including a body with a hook at one end and a pair of spaced laterally extending guide pins extending from opposite sides of said body and into said nonlinear tracks of said housing when said housing is folded around said hook for guiding said garment hook in a nonlinear path as it translates from a stored position within said housing to an extended position from said housing for use.

2. The assembly as defined in claim 1 and further including a viscous damper mounted to said housing and engaging said body of said garment hook.

3. The assembly as defined in claim 2 wherein said housing includes a spool and a push-out spring mounted to said spool and having an end engaging said garment hook for urging said hook to an extended position.

4. The assembly as defined in claim 3 and including a push-push latch assembly for releasably holding said hook in a retracted position.

5. The assembly as defined in claim 4 wherein said garment hook body has an edge including a plurality of teeth which engage teeth of a gear extending from said viscous damper.

6. The assembly as defined in claim 4 wherein said push-push latch includes a heart-shaped track.

7. The assembly as defined in claim 1 wherein said housing and hook are each integrally molded of a polymeric material.

8. The assembly as defined in claim 7 wherein said housing sections including mounting posts for joining said sections in spaced relationship for receiving said garment hook therein.

9. A garment hook housing for receiving a garment hook, wherein said housing comprises:
   a pair of housing sections joined by an integral hinge such that the garment hook can be positioned between the sections, which are subsequently closed and secured to one another, said housing including nonlinear tracks formed in said sections to receive laterally extending pins of a garment hook for guiding a garment hook in a nonlinear path as it translates from a stored position within said housing to an extended position for use.

10. The housing as defined in claim 9 and further including a viscous damper mounted to said housing for engaging a garment hook.

11. The housing as defined in claim 10 and further including a push-push, spring-loaded latch assembly extending between said housing and a garment hook.

12. The housing as defined in claim 11 in combination with a garment hook which includes a body having an edge including a plurality of teeth and wherein said viscous damper includes a gear with teeth engaging said plurality of teeth on said body.

13. The housing as defined in claim 12 wherein said push-push latch includes a heart-shaped track.

14. A garment hook assembly comprising:
   an integrally molded polymeric housing including a pair of housing sections joined by an integral hinge such that a garment hook can be positioned between said sections, which are subsequently closed and secured to one another in spaced opposed relationship, said housing sections including curved tracks formed in said sections; and
   a garment hook extending within said housing and including a body with laterally extending guide pins extending within said curved tracks to guide the garment hook in a nonlinear path as it translates from a stored position within said housing to an extended position for use.

15. The assembly as defined in claim 14 wherein said garment hook includes a pair of spaced guide pins extending outwardly from opposite sides.

16. The assembly as defined in claim 15 wherein said housing includes a spool and a push-out spring mounted to said spool and having an end engaging said garment hook for urging said hook to an extended position.

17. The assembly as defined in claim 16 and further including a viscous damper mounted to said housing and engaging said garment hook.

18. The assembly as defined in claim 17 and including a push-push latch assembly for releasably holding said hook in a retracted position.

19. The assembly as defined in claim 18 wherein said housing and hook are each integrally molded of a polymeric material.

20. The assembly as defined in claim 19 wherein said housing sections including mounting posts for joining said sections in spaced relationship for receiving said garment hook therein.

* * * * *